United States Patent
Masuda et al.

(10) Patent No.: US 12,198,093 B2
(45) Date of Patent: Jan. 14, 2025

(54) LUGGAGE DELIVERY MANAGEMENT SYSTEM, LUGGAGE DELIVERY METHOD, AND VEHICLE

(71) Applicant: TOYOTA JIDOSHA KABUSHIKI KAISHA, Toyota (JP)

(72) Inventors: Taizo Masuda, Yokohama (JP); Kiyoto Sasaki, Susono (JP); Daisuke Kakuma, Toyota (JP); Hiroyoshi Masui, Susono (JP); Akihiro Yamaguchi, Toyota (JP); Sokfan Yee, Toyota (JP); Yuki Nishikawa, Numzau (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/325,620

(22) Filed: May 30, 2023

(65) Prior Publication Data

US 2024/0054442 A1    Feb. 15, 2024

(30) Foreign Application Priority Data

Aug. 9, 2022 (JP) ................................ 2022-127111

(51) Int. Cl.
*G06Q 10/0835* (2023.01)
(52) U.S. Cl.
CPC ............................... *G06Q 10/08355* (2013.01)
(58) Field of Classification Search
CPC ............................................... G06Q 10/06316
USPC ........................................................ 705/338
See application file for complete search history.

(56) References Cited

U.S. PATENT DOCUMENTS

| | | | |
|---|---|---|---|
| 9,589,249 B1* | 3/2017 | Janis ..................... | G06Q 10/087 |
| 2015/0178823 A1 | 6/2015 | Tanaka et al. | |
| 2016/0349067 A1* | 12/2016 | Fowe ................... | G01C 21/343 |
| 2017/0220966 A1* | 8/2017 | Wang ................. | G06Q 20/3224 |
| 2018/0285792 A1* | 10/2018 | Zhang ............... | G06Q 10/0631 |
| 2019/0057326 A1* | 2/2019 | Li ........................ | G06Q 50/40 |

(Continued)

FOREIGN PATENT DOCUMENTS

| | | |
|---|---|---|
| JP | 2019-079425 A | 5/2019 |
| JP | 2019-144938 A | 8/2019 |
| WO | 2014/010381 A1 | 1/2014 |

OTHER PUBLICATIONS

"Introducing Priority Delivery and Restaurant Rewards Programs," by Uber, Jun. 15, 2020 (Year: 2020).*

*Primary Examiner* — Jeff Zimmerman
*Assistant Examiner* — Brian Adams Heflin
(74) *Attorney, Agent, or Firm* — Oliff PLC

(57) ABSTRACT

A luggage delivery management system manages a service of delivering luggage deposited by a user to a destination specified by the user. The luggage delivery management system acquires payment amount information indicating an amount equivalent to a payment amount paid by the user for the service. When multiple pieces of luggage of a plurality of the users are delivered by one vehicle, the luggage delivery management system determines whether to set priority of the multiple pieces of luggage. The luggage delivery management system sets the priority of the luggage of the user who pays more to be higher based on the payment amount information when the priority is set. Then, the luggage delivery management system sets a luggage delivery route of the vehicle such that the multiple pieces of luggage are delivered to the destinations in accordance with the priority.

8 Claims, 7 Drawing Sheets

(56) References Cited

U.S. PATENT DOCUMENTS

| | | |
|---|---|---|
| 2019/0130343 A1 | 5/2019 | Taguchi et al. |
| 2019/0258990 A1 | 8/2019 | Makita et al. |
| 2020/0097890 A1* | 3/2020 | Migita .................. G06Q 10/08 |
| 2021/0326966 A1* | 10/2021 | DeLuca ............. G06Q 30/0637 |
| 2022/0092497 A1* | 3/2022 | Roth ................ G06Q 10/06313 |
| 2023/0121652 A1* | 4/2023 | Francis ................ G06Q 10/087 |
| | | 705/26.8 |

* cited by examiner

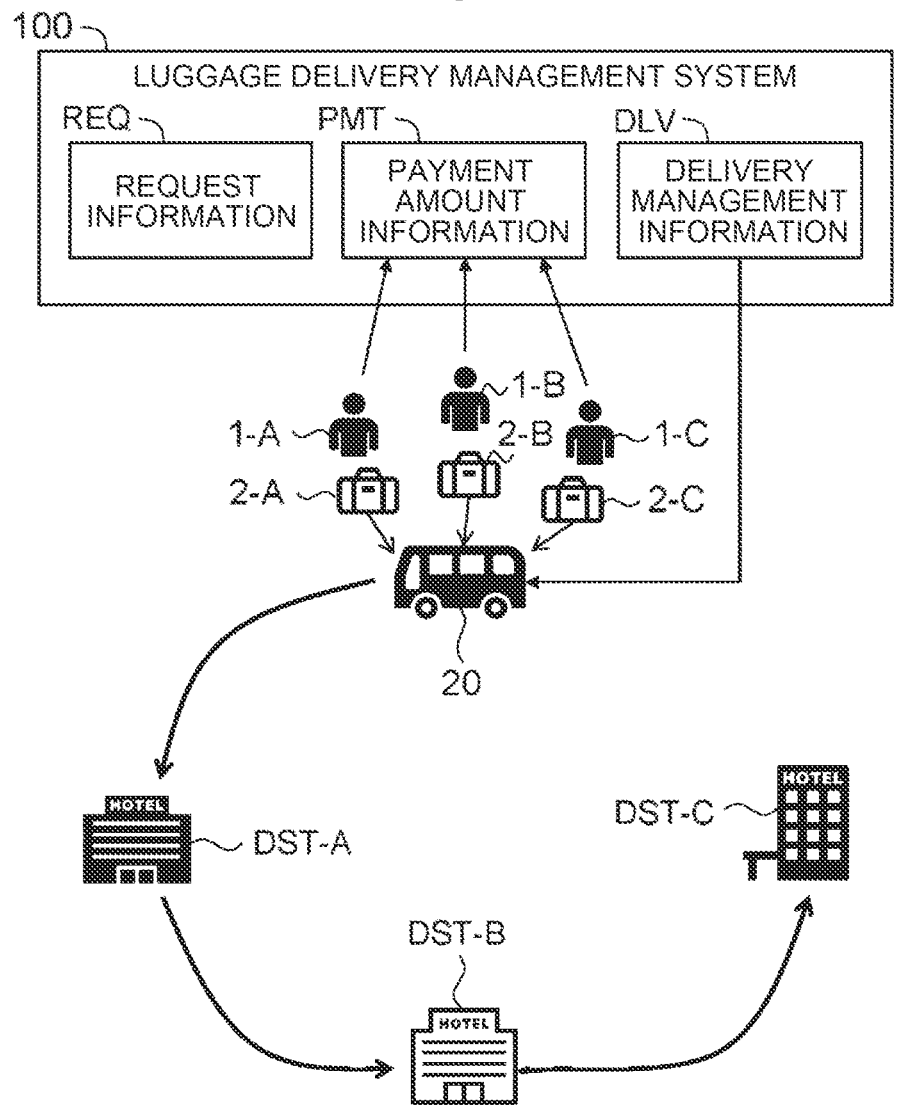

LUGGAGE DELIVERY MANAGEMENT SYSTEM, LUGGAGE DELIVERY METHOD, AND VEHICLE

CROSS-REFERENCE TO RELATED APPLICATION

This application claims priority to Japanese Patent Application No. 2022-127111 filed on Aug. 9, 2022, incorporated herein by reference in its entirety.

BACKGROUND

1. Technical Field

The present disclosure relates to a luggage delivery service that delivers luggage deposited by a user to a destination specified by the user.

2. Description of Related Art

Japanese Unexamined Patent Application Publication No. 2019-079425 (JP 2019-079425 A) discloses a luggage collection and delivery system that performs a luggage delivery service using a luggage compartment of an autonomous vehicle. At a drop-off point, the luggage of the user is stored in the luggage compartment of the autonomous vehicle. The autonomous vehicle moves from the drop-off point to a pick-up point. At the pick-up point, the luggage of the user is taken out from the luggage compartment of the autonomous vehicle.

SUMMARY

A consideration is given to a luggage delivery service that delivers luggage deposited by a user to a destination specified by the user. When one vehicle sequentially delivers multiple pieces of luggage for multiple users, there is a possibility that one user mistakenly picks up the luggage of another user. In that case, the other user cannot pick up the own luggage. It is conceivable that there are a certain number of users who feel uneasy about losing their luggage. Therefore, there is room for improvement in the luggage delivery service.

A first aspect relates to a luggage delivery management system that manages a service of delivering luggage deposited by a user to a destination specified by the user.

The luggage delivery management system includes one or more processors.

The one or more processors: acquire request information indicating a destination and payment amount information indicating an amount equivalent to a payment amount paid by the user for the service; determine, when multiple pieces of luggage of a plurality of the users are delivered by one vehicle, whether to set priority of the multiple pieces of luggage; set the priority of the luggage of the user who pays more to be higher based on the payment amount information when the priority is set; and set a luggage delivery route of the one vehicle such that the multiple pieces of luggage are delivered to the destinations in accordance with the priority.

A second aspect relates to a luggage delivery management method that manages a service of delivering luggage deposited by a user to a destination specified by the user.

The luggage delivery management method includes: acquiring request information indicating a destination and payment amount information indicating an amount equivalent to a payment amount paid by the user for the service; determining, when multiple pieces of luggage of a plurality of the users are delivered by one vehicle, whether to set priority of the multiple pieces of luggage; setting the priority of the luggage of the user who pays more to be higher based on the payment amount information when the priority is set; and setting a luggage delivery route of the one vehicle such that the multiple pieces of luggage are delivered to the destinations in accordance with the priority.

A third aspect relates to a vehicle to be used in a service of delivering luggage deposited by a user to a destination specified by the user.

The vehicle includes one or more processors.

The one or more processors: acquire request information indicating a destination and payment amount information indicating an amount equivalent to a payment amount paid by the user for the service; determine, when multiple pieces of luggage of a plurality of the users are delivered, whether to set priority of the multiple pieces of luggage;

set the priority of the luggage of the user who pays more to be higher based on the payment amount information when the priority is set; and set a luggage delivery route of the one vehicle such that the multiple pieces of luggage are delivered to the destinations in accordance with the priority.

The later the delivery order, the higher the possibility that the luggage is lost. On the contrary, the earlier the delivery order, the lower the possibility that the luggage is lost. According to the present embodiment, a higher priority is set for the luggage of the user who pays more for the luggage delivery service. Then, the multiple pieces of luggage are delivered to the respective delivery destinations in accordance with the priority. Therefore, the user who feels uneasy about the loss of the luggage can positively advance the delivery order of the own luggage by increasing the payment amount at the user's own will. With the above, the anxiety of the user is alleviated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a conceptual diagram for explaining a luggage delivery management process in which one vehicle delivers the multiple pieces of luggage for the users;

FIG. 5 is a conceptual diagram showing an example of setting priority of the multiple pieces of luggage;

DETAILED DESCRIPTION OF EMBODIMENTS

Embodiments of the present disclosure will be described with reference to the accompanying drawings.

1. Overview of Luggage Delivery Service and Luggage Delivery Management System

Figure 1:
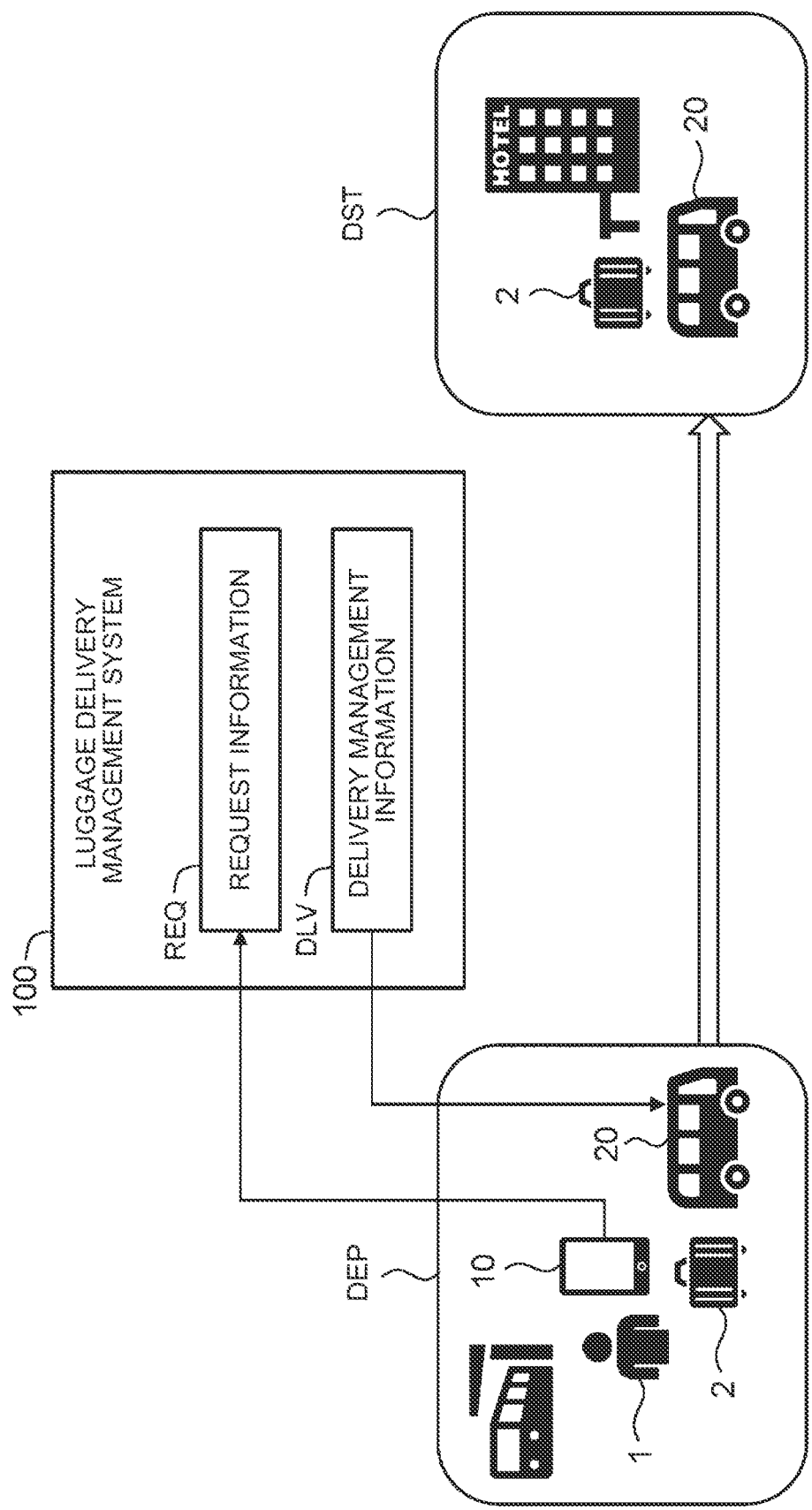
FIG. 1 is a conceptual diagram for explaining an overview of a luggage delivery service and a luggage delivery management system according to the present embodiment.

FIG. 1 is a conceptual diagram for explaining an overview of a luggage delivery service and a luggage delivery management system 100 according to the present embodiment. The luggage delivery service is a service for delivering luggage 2 deposited by a user 1 to a delivery destination DST specified by the user 1.

For example, the user 1 arrives at a certain station for sightseeing purposes. The user 1 carries the luggage 2 such as a suitcase. Since it is troublesome for the user 1 to go sightseeing with the luggage 2, there is a need of the user 1 to leave the luggage 2 somewhere while sightseeing. However, when the user 1 leaves the luggage 2 in a luggage locker in front of the station, the user 1 always needs to come back to the luggage locker in front of the station to pick up the luggage 2 after sightseeing. When the user 1 takes an accommodation at the tourist spot, returning to the luggage locker in front of the station is troublesome for the user 1 and this results in a waste of time. On the other hand, when the luggage 2 deposited by the user 1 is delivered to the accommodation of the user 1, the user 1 can pick up the luggage 2 at the accommodation without returning to the luggage locker in front of the station. In such cases, the luggage delivery service according to the present embodiment is useful.

A vehicle 20 is used for the luggage delivery service. The vehicle 20 may be a manually operated vehicle or an autonomous vehicle. The vehicle 20 is provided with a luggage storage portion (storage space) capable of storing multiple pieces of luggage 2.

A collection location DEP is a location where the luggage 2 of the user 1 is loaded onto the vehicle 20. That is, the collection location DEP is a place where the luggage 2 is dropped off from the point of view of the user 1, and a place where the luggage 2 is picked up from the point of view of the vehicle 20. For example, the collection location DEP is set in advance at a predetermined location (e.g. a roundabout in front of a station, a carriage porch at an airport). As another example, a desired collection location DEP may be specified by the user 1. The user 1 carries the luggage 2 to the collection location DEP. The vehicle 20 moves to the collection location DEP and stops at the collection location DEP. The luggage 2 of the user 1 is loaded onto the vehicle 20 at the collection location DEP. The user 1 may load the luggage 2 onto the vehicle 20, or a service staff member may load the luggage 2 onto the vehicle 20. Alternatively, loading of the luggage 2 onto the vehicle 20 may be automatically performed by an arm robot mounted on the vehicle 20.

The delivery destination DST is where the luggage 2 of the user 1 is unloaded from the vehicle 20. That is, the delivery destination DST is a place where the luggage 2 is picked up from the point of view of the user 1, and a place where the luggage 2 is dropped off from the point of view of the vehicle 20. The delivery destination DST is specified by the user 1. Typically, the delivery destination DST is a place where the user 1 stops by (e.g. accommodation). After the luggage 2 of the user 1 is loaded onto the vehicle at the collection location DEP, the vehicle 20 moves to the delivery destination DST. The luggage 2 of the user 1 is unloaded from the vehicle 20 at the delivery destination DST. The user 1 may unload the luggage 2 from the vehicle 20, a service staff member may unload the luggage 2 from the vehicle 20, or a staff member at the delivery destination DST (e.g. accommodation) may unload the luggage 2 from the vehicle 20. Alternatively, unloading of the luggage 2 from the vehicle 20 may be automatically performed by an arm robot mounted on the vehicle 20.

The luggage delivery management system 100 performs a "luggage delivery management process" for managing the luggage delivery service described above. For example, the luggage delivery management system 100 is included in a management server. As another example, the luggage delivery management system 100 may be included in the vehicle 20. As still another example, the luggage delivery management system 100 may be distributed between the management server and the vehicle 20.

The luggage delivery management system 100 communicates with a terminal 10 operated by the user 1. For example, the terminal 10 is a mobile terminal (e.g. smart phone) of the user 1. As another example, the terminal 10 may be an information terminal (e.g. digital signage) installed in towns or buildings.

The user 1 operates the terminal 10 to input request information REQ related to the luggage delivery service. The terminal 10 transmits the request information REQ input by the user 1 to the luggage delivery management system 100.

Figure 2:
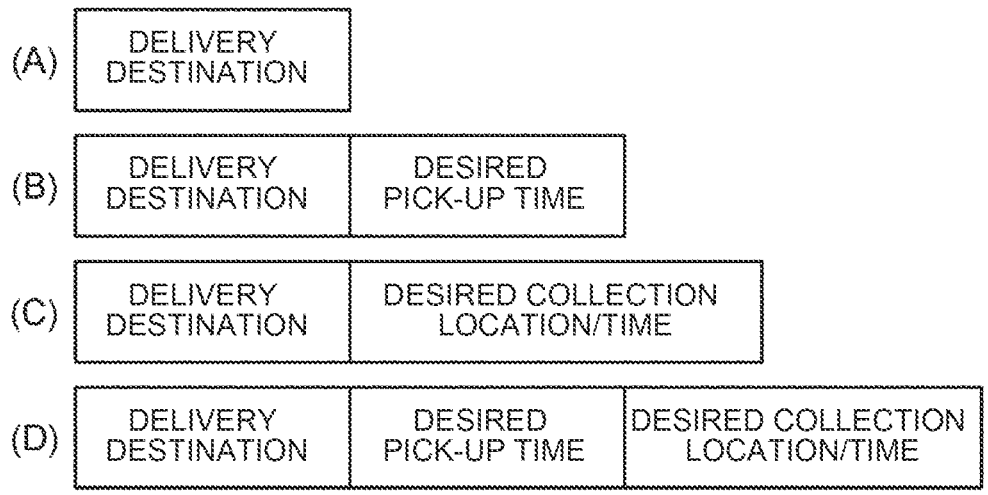
FIG. 2 is a conceptual diagram showing various examples of request information according to the embodiment.

FIG. 2 is a conceptual diagram showing various examples of the request information REQ. The request information REQ indicates at least the delivery destination DST specified by the user 1. The request information REQ may also indicate a desired pick-up time specified by the user 1. The desired pick-up time is the time (time or time period) at which the user 1 wishes to pick up the luggage 2. The request information REQ may also indicate a desired collection location and a desired collection time specified by the user 1. The desired collection location is the location where the user 1 wishes to leave the luggage 2 in the vehicle 20. The desired collection time is the time (time or time period) that the user 1 wishes to leave the luggage 2 in the vehicle 20.

The luggage delivery management system 100 acquires the request information REQ from the terminal 10. The luggage delivery management system 100 generates delivery management information DLV based on the request information REQ. The delivery management information DLV indicates at least a luggage delivery route (target route) of the vehicle 20 from the collection location DEP to the delivery destination DST. The collection location DEP may be a predetermined location or a desired collection location specified by the user 1. When the request information REQ indicates the desired pick-up time specified by the user 1, the delivery management information DLV indicates the desired pick-up time. When the request information REQ indicates the desired collection location and desired collection time, the delivery management information DLV indicates the desired collection location and desired collection time.

The luggage delivery management system 100 provides the vehicle 20 with the delivery management information DLV and instructs the vehicle 20 to deliver the luggage 2 to the delivery destination DST in accordance with the delivery management information DLV. In other words, the luggage delivery management system 100 at least instructs the vehicle 20 to deliver the luggage 2 to the delivery destination DST in accordance with the luggage delivery route. When the delivery management information DLV indicates the desired collection location and desired collection time, the luggage delivery management system 100 instructs the vehicle 20 to arrive at the desired collection location by the desired collection time. When the delivery management information DLV indicates the desired pick-up time, the luggage delivery management system 100 instructs the vehicle 20 to deliver the luggage 2 to the delivery destination DST by the desired pick-up time as much as possible. The vehicle 20 travels from the collection location DEP to the delivery destination DST in accordance with the delivery management information DLV.

2. When Multiple Pieces of Luggage of Multiple Users are Delivered

Figure 3:
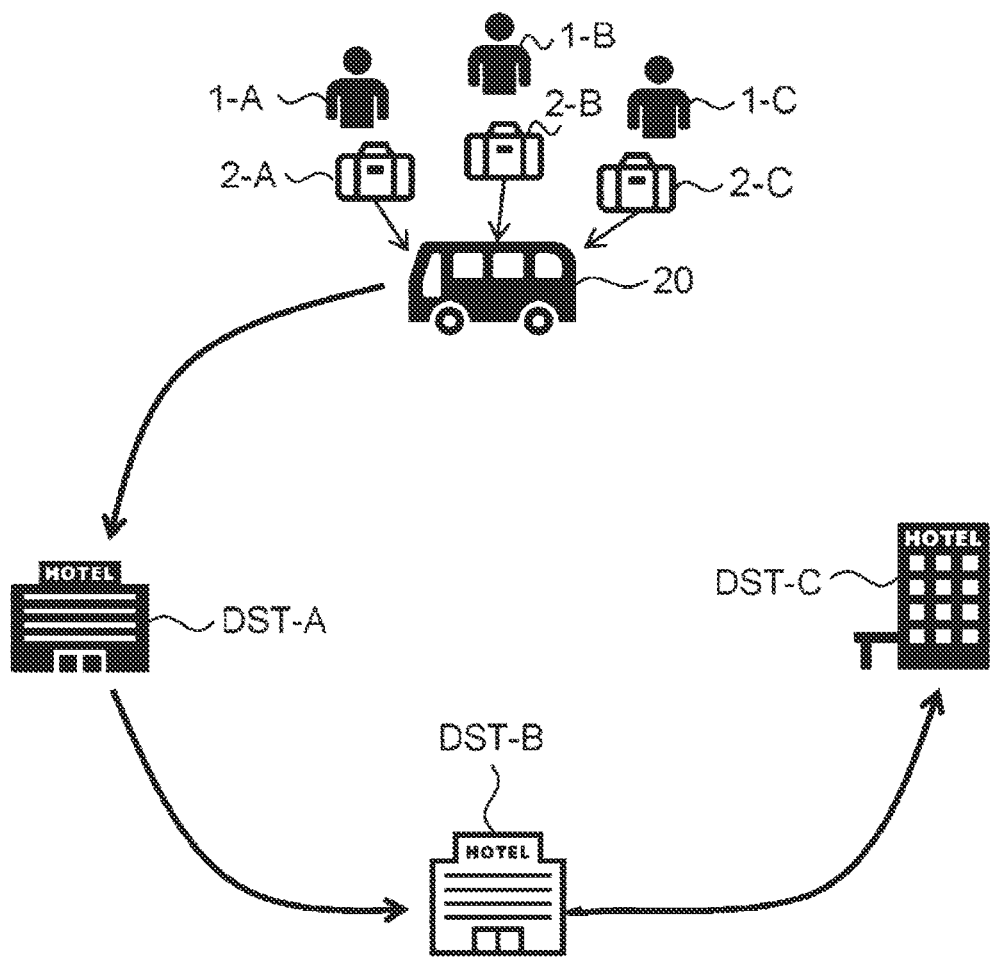
FIG. 3 is a conceptual diagram for explaining a case where one vehicle delivers multiple pieces of luggage for a plurality of users.

FIG. 3 is a conceptual diagram for explaining a case where one vehicle 20 delivers multiple pieces of luggage 2 for multiple users 1. In the example shown in FIG. 3, there are three users 1-A, 1-B, and 1-C. Luggage 2-A, luggage 2-B, and luggage 2-C are pieces of luggage 2 of the users 1-A, 1-B, and 1-C, respectively. Delivery destinations DST-A, DST-B, and DST-C are delivery destinations DST specified by the users 1-A, 1-B, and 1-C, respectively.

Each of the users 1 carries own luggage 2 to a predetermined collection location DEP or a desired collection location DEP. That is, the multiple pieces of luggage 2 are carried by the respective users 1 to one or more collection locations DEP. One vehicle 20 moves to one or more collection locations DEP. The multiple pieces of luggage 2 are loaded onto one vehicle 20 at one or more collection locations DEP. After that, one vehicle 20 sequentially delivers the multiple pieces of luggage 2 to multiple delivery destinations DST.

The inventors of the present application have recognized the following problem when one vehicle 20 delivers the multiple pieces of luggage 2 of the users 1 in order. That is, there is a possibility that a certain user 1 may mistakenly pick up the luggage 2 of another user 1 at a certain delivery destination DST. In that case, the other user 1 cannot pick up the own luggage 2. It is conceivable that there are a certain number of users 1 who feel uneasy about losing their luggage 2. Therefore, there is room for improvement in the luggage delivery services.

FIG. 4 is a conceptual diagram for explaining a luggage delivery management process in which one vehicle 20 delivers the multiple pieces of luggage 2 for the users 1. The luggage delivery management system 100 sets the priority of the multiple pieces of luggage 2 (that is, multiple users 1) when a specific condition is satisfied. For example, the specific condition is that the desired pick-up times specified by two or more users 1 are the same or close. In this case, the priority of the luggage 2 of each of the two or more users 1 is set. As another example, the specific condition is that none of the users 1 have specified the desired pick-up time. Also in this case, the priority of the multiple pieces of luggage 2 is set. In any case, the luggage delivery management system 100 determines whether to set the priority of the multiple pieces of luggage 2 based on the request information REQ related to the users 1.

According to the present embodiment, the priority of the multiple pieces of luggage 2 is determined based on the payment amount that each user 1 pays for the luggage delivery service. Therefore, the usage fee of the luggage delivery service is defined as the sum of a basic charge and a surcharge. In addition to the basic charge, the user 1 can voluntarily pay the surcharge. Specifically, when the user 1 operates the terminal 10 to input the request information REQ, the user 1 specifies the surcharge when necessary. When no surcharge is specified, the surcharge is assumed to be zero.

Payment amount information PMT is information indicating an amount equivalent to the payment amount that the user 1 intends to pay for the luggage delivery service. For example, the payment amount information PMT indicates the sum of the basic charge and the surcharge specified by the user 1. As another example, the payment amount information PMT may indicate only the surcharge specified by the user 1. When the basic fee is constant, the surcharge can be said to be an amount corresponding to the payment amount that the user intends to pay.

The terminal 10 transmits the payment amount information PMT to the luggage delivery management system 100. The luggage delivery management system 100 acquires the payment amount information PMT from the terminal 10. When it is necessary to set the priority of the multiple pieces of luggage 2, the luggage delivery management system 100 sets the priority based on the payment amount information PMT related to the users 1. More specifically, the luggage delivery management system 100 sets a higher priority of the luggage 2 of the user 1 who pays more.

FIG. 5 shows an example of priority setting. In the example shown in FIG. 5, it is assumed that none of the users 1-A, 1-B, and 1-C have specified the desired pick-up time. The respective payment amounts of the users 1-A, 1-B, and 1-C are X, Y, and Z, and the relationship between these payment amounts X, Y, and Z is "X>Y>Z". In this case, the luggage 2-A of the user 1-A has the highest priority, and the luggage 2-C of the user 1-C has the lowest priority.

Figure 6:
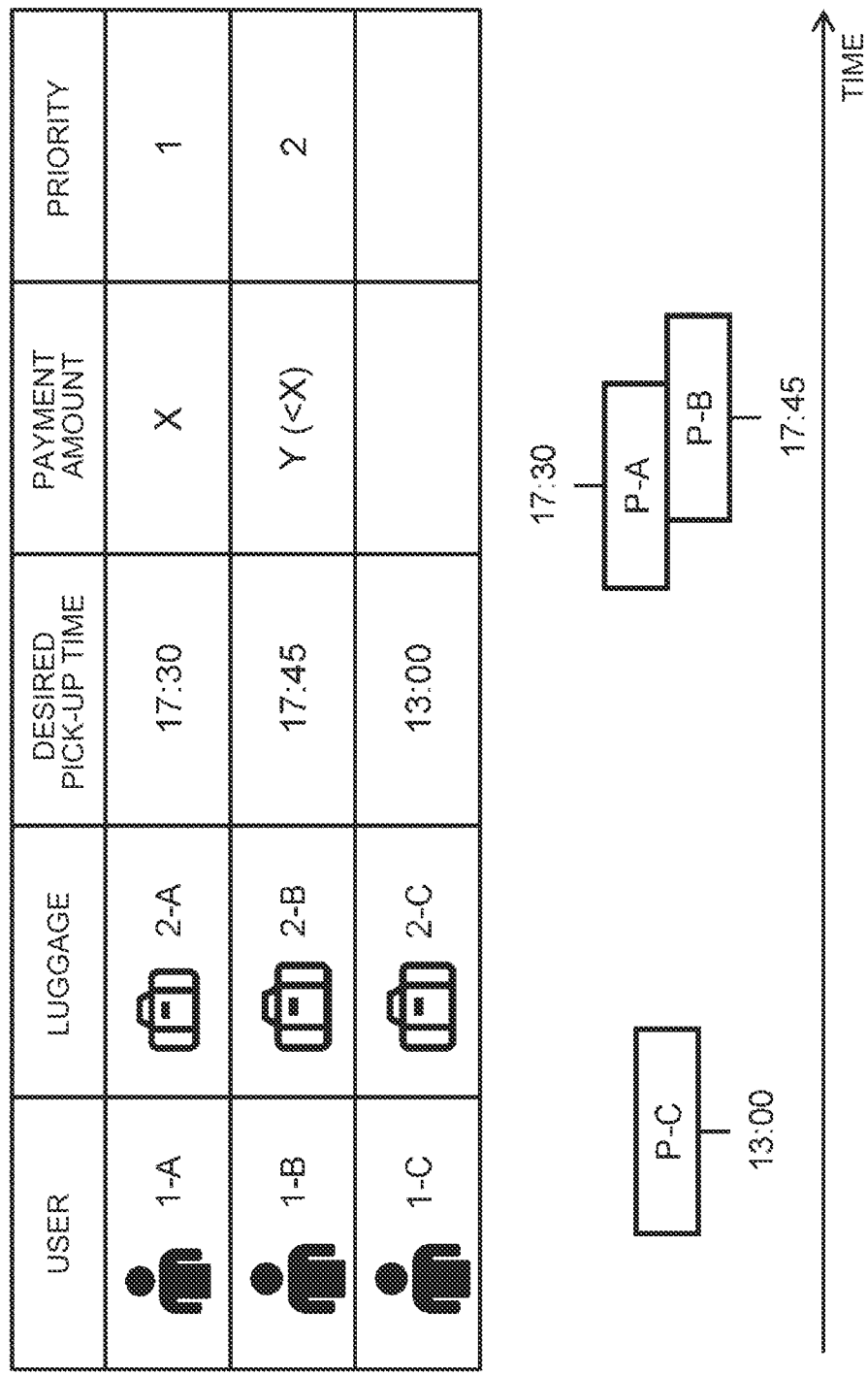
FIG. 6 is a conceptual diagram showing another example of setting priority of the multiple pieces of luggage.

FIG. 6 shows another example of priority setting. In the example shown in FIG. 6, it is assumed that each of the users 1-A, 1-B, and 1-C has specified the desired pick-up time. Here, the concept of "comparison period" is introduced in order to determine whether there are users 1 with the same or similar desired pick-up times. The comparison period is a predetermined period including the desired pick-up time. For example, the comparison period is a period including 30 minutes before and after the desired pick-up time. When the desired pick-up time is specified as a time period instead of the time, the time period may be used as the comparison period.

The luggage delivery management system 100 compares comparison periods P-A, P-B, and P-C for each of the users 1-A, 1-B, and 1-C. In the example shown in FIG. 6, the desired pick-up time for the user 1-A is 17:30, the desired pick-up time for the user 1-B is 17:45, and the comparison period P-A for the user 1-A and the comparison period P-B for the user 1-B overlap with each other. In this case, the luggage 2-A of the user 1-A and the luggage 2-B of the user 1-B are subject to priority setting. Since the payment amount X of the user 1-A is larger than the payment amount Y of the user 1-B, the priority of the luggage 2-A of the user 1-A is higher than the luggage 2-B of the user 1-B.

As described above, when there are two or more users 1 whose comparison periods at least partially overlap with each other, the luggage delivery management system 100 sets the priority of the luggage 2 of each of the two or more users 1. The user 1 whose comparison period does not overlap is excluded from targets of the priority setting.

After the priority of the multiple pieces of luggage 2 is set, the luggage delivery management system 100 sets the luggage delivery route of the vehicle 20 such that the multiple pieces of luggage 2 are delivered to respective delivery destinations DST in accordance with the set priority. That is, the luggage delivery management system 100 sets the luggage delivery route of the vehicle 20 such that the luggage 2 with the highest priority is delivered first in descending order. Then, the luggage delivery management system 100 then provides the vehicle 20 with the delivery management information DLV and instructs the vehicle 20 to deliver the multiple pieces of luggage 2 to the respective delivery destinations DST in accordance with the luggage delivery route.

In the case of the example shown in FIG. 5, first, the luggage 2-A of the user 1-A is delivered to the delivery destination DST-A. Next, the luggage 2-B of the user 1-B is delivered to the delivery destination DST-B. Finally, the luggage 2-C of the user 1-C is delivered to the delivery destination DST-C.

In the case of the example shown in FIG. 6, basically, the pieces of luggage 2 are delivered in the order of the desired pick-up times. However, the multiple pieces of luggage 2 with the same or close desired pick-up times, that is, the multiple pieces of luggage 2 to which the priority is set, are delivered in accordance with the priority. That is, first, the luggage 2-C of the user 1-C with the earliest desired pick-up time is delivered to the delivery destination DST-C. Next, the luggage 2-A of the user 1-A is delivered to the delivery destination DST-A. Finally, the luggage 2-B of the user 1-B is delivered to the delivery destination DST-B.

Effects

The luggage 2 later in the delivery order may be mistaken for another luggage 2 and picked up at an earlier delivery destination DST. In other words, the later the delivery order, the higher the possibility that the luggage 2 is lost. On the contrary, the earlier the delivery order, the lower the possibility that the luggage 2 is lost.

According to the present embodiment, a higher priority is set for the luggage 2 of the user 1 who pays more for the luggage delivery service. Then, the multiple pieces of luggage 2 are delivered to the respective delivery destinations DST in accordance with the priority. Therefore, the user 1 who feels uneasy about the loss of the luggage 2 can positively advance the delivery order of the own luggage 2 by increasing the payment amount at the user's own will. With the above, the anxiety of the user 1 is alleviated.

3. Modification (Notification of Priority)

Figure 7:
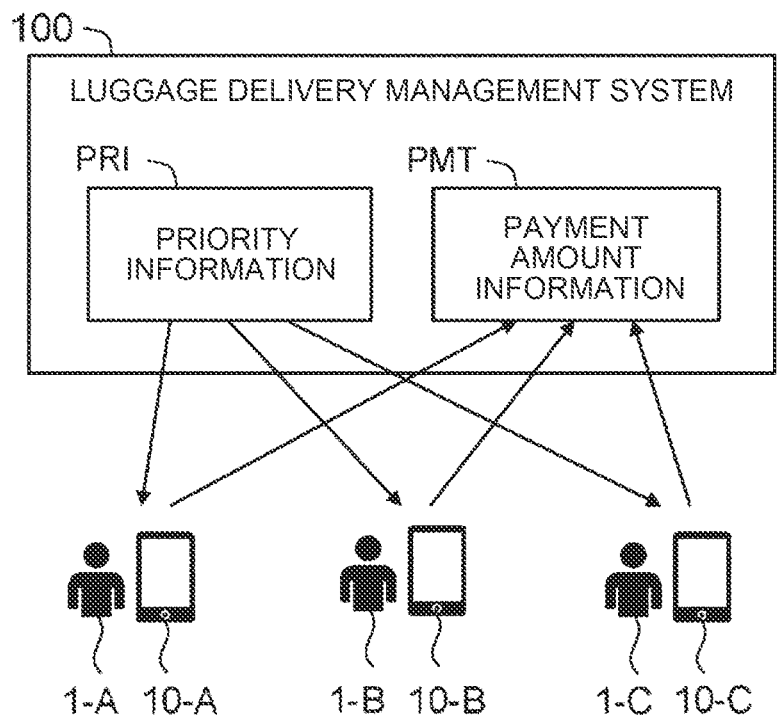
FIG. 7 is a conceptual diagram for explaining priority notification to the user.

FIG. 7 is a diagram illustrating a modification. Priority information PRI is information related to the priority set by the luggage delivery management system 100. For example, the priority information PRI indicates the correspondence between identification information of the user 1 or the luggage 2 and the priority. The priority information PRI may indicate the correspondence between the identification information of the user 1 or the luggage 2, the payment amount, and the priority. After setting the priority, the luggage delivery management system 100 notifies the users 1 of the priority information PRI through the terminal 10. Specifically, the luggage delivery management system 100 transmits the priority information PRI to the terminal 10 operated by each user 1, and the terminal 10 presents the priority information PRI to each user 1.

The user 1 who has received a notification of the priority information PRI recognizes the priority of the luggage 2 of the user 1. The user 1 who recognizes the priority of the luggage 2 of the user 1 can consider changing the payment amount. For example, the user 1 who is unsatisfied with the priority can consider a further increase in payment. As another example, the user 1 who gives up on the priority may also consider reducing the surcharge.

The luggage delivery management system 100 accepts a change in the payment amount. More specifically, the user 1 operates the terminal 10 to change the payment amount (surcharge) as necessary. The terminal 10 transmits the changed payment amount information PMT to the luggage delivery management system 100. The luggage delivery management system 100 receives the changed payment amount information PMT and updates the payment amount information PMT. Then, the luggage delivery management system 100 resets the priority of the multiple pieces of luggage 2 based on the updated payment amount information PMT.

According to the modification, the user 1 is given the opportunity to change the payment amount. With the above, the convenience for the user 1 is further improved.

4. Example of Luggage Delivery Management System 4-1. Configuration Example

Figure 8:
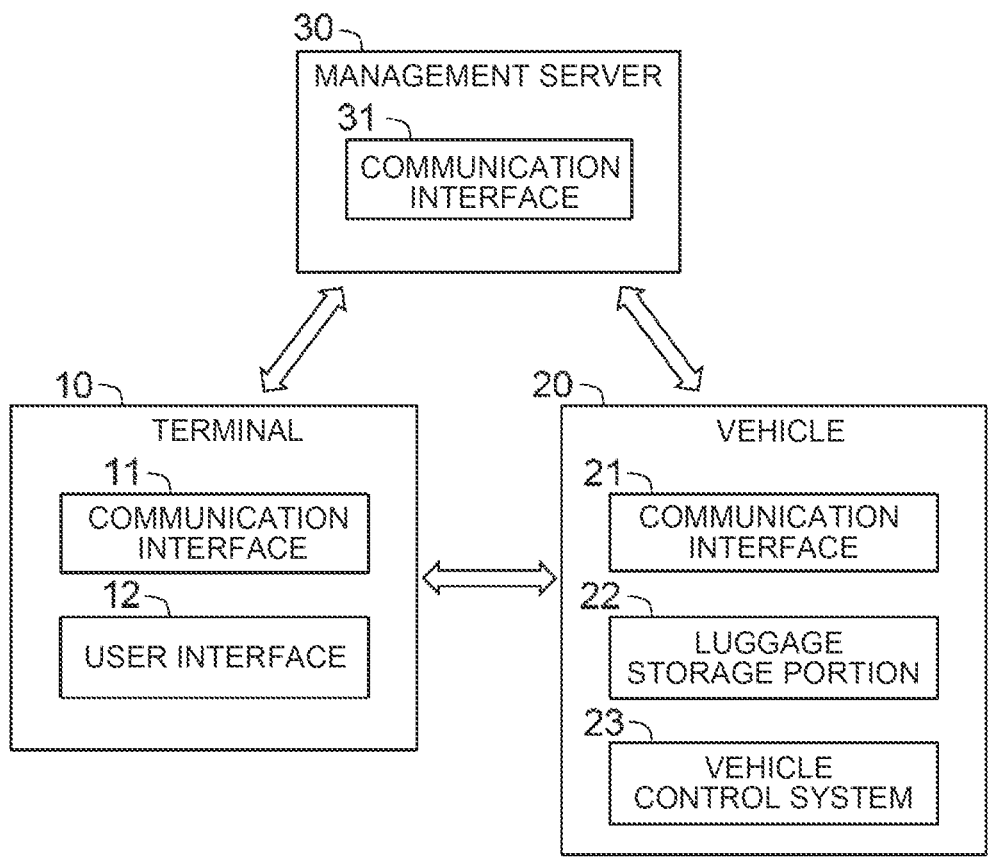
FIG. 8 is a block diagram showing a configuration related to the luggage delivery management system according to the embodiment.

FIG. 8 is a block diagram showing the terminal 10, the vehicle 20, and the management server 30 as configurations related to the luggage delivery management system 100 according to the present embodiment. The management server 30 can communicate with the terminal 10 and the vehicle 20. The terminal 10 and the vehicle 20 may be able to communicate directly.

The terminal 10 is operated by the user 1. Examples of the terminal 10 include a mobile terminal (e.g. smart phone) of the user 1, an information terminal (e.g. digital signage) installed in towns and buildings, and the like.

The terminal 10 includes a communication interface 11 and a user interface 12. The terminal 10 communicates with the management server 30 via the communication interface 11. The terminal 10 may communicate with the vehicle 20 via the communication interface 11. The user interface 12 receives information from the user 1 and provides the user 1 with information. Examples of the user interface 12 include a touch panel, a keyboard, a display device, and the like.

The user 1 can input the request information REQ and the payment amount information PMT using the user interface 12. The terminal 10 transmits the request information REQ and the payment amount information PMT to the vehicle 20 or the management server 30 via the communication interface 11.

Further, the terminal 10 may receive the priority information PRI via the communication interface 11. In that case, the terminal 10 presents the user 1 with the priority information PRI via the user interface 12. For example, the terminal 10 displays the priority information PRI on the display device.

The vehicle 20 is used for the luggage delivery service. The vehicle 20 may be an autonomous vehicle.

The vehicle 20 includes a communication interface 21, a luggage storage portion 22, and a vehicle control system 23. The vehicle 20 communicates with the management server 30 via the communication interface 21. The vehicle 20 may communicate with the terminal 10 via the communication interface 21. The luggage storage portion 22 is configured to be able to store a large number of pieces of luggage 2.

The vehicle control system 23 controls the vehicle 20. When the vehicle 20 is an autonomous vehicle, the vehicle control system 23 controls autonomous driving of the vehicle 20. For example, the vehicle control system 23 controls the vehicle 20 so as to travel along the specified luggage delivery route. Further, the vehicle control system 23 may control opening and closing of a door when the luggage 2 is loaded and unloaded.

The management server 30 includes a communication interface 31. The management server 30 communicates with the terminal 10 and the vehicle 20 via the communication interface 31.

For example, the luggage delivery management system 100 is included in the management server 30. The luggage delivery management system 100 included in the management server 30 can receive necessary information from the terminal 10 and provide the terminal 10 and the vehicle 20 with various types of information. As another example, the luggage delivery management system 100 may be included in the vehicle 20. The luggage delivery management system 100 included in the vehicle 20 can receive necessary information from the terminal 10 directly or via the management server 30, and can provide the terminal 10 with various types of information. As still another example, the luggage delivery management system 100 may be distributed between the vehicle 20 and the management server 30. In general, the luggage delivery management system 100 has the following configuration.

Figure 9:
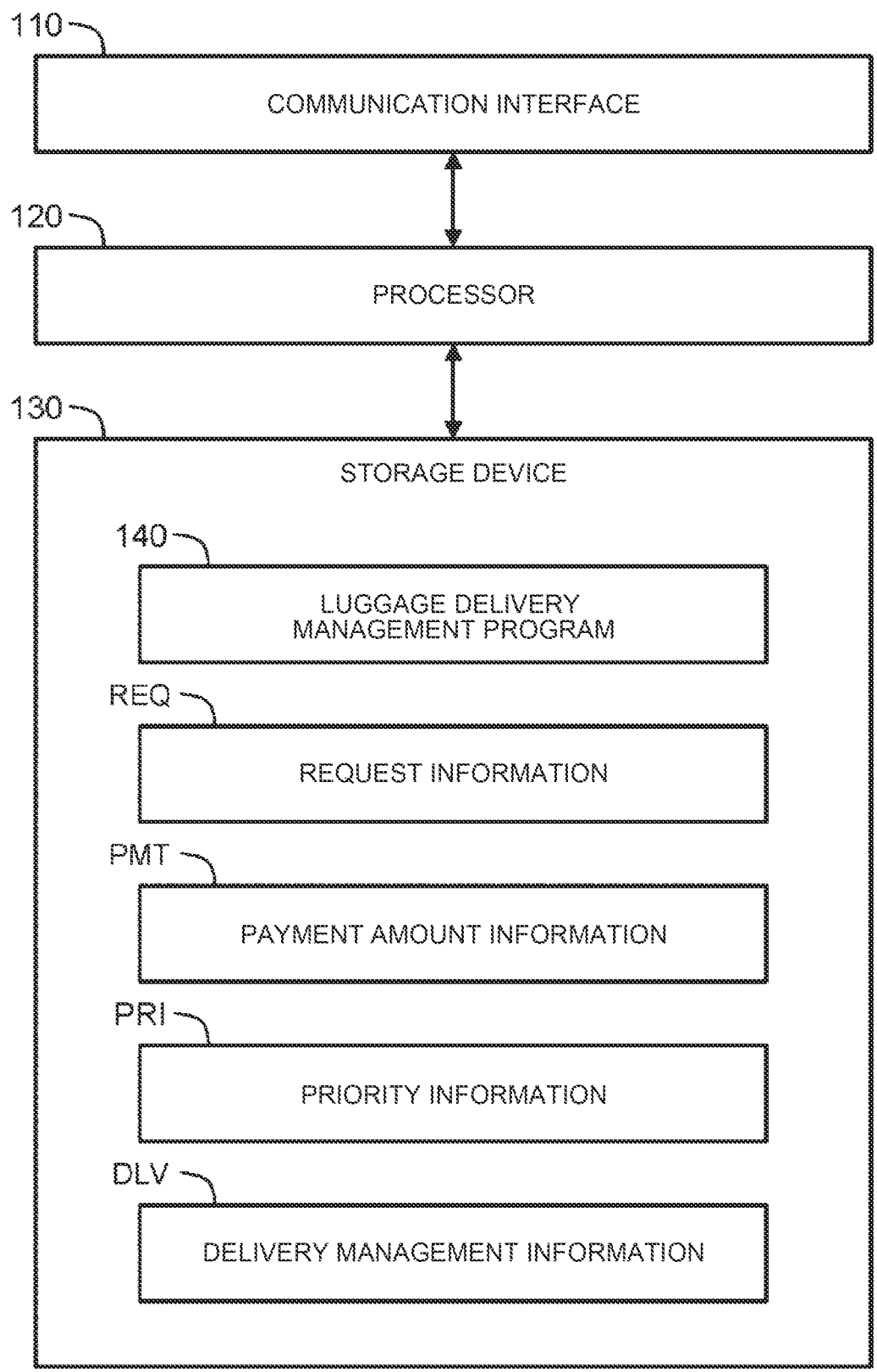
FIG. 9 is a block diagram showing a configuration related to the luggage delivery management system according to the embodiment.

FIG. 9 is a block diagram showing the configuration of the luggage delivery management system 100. The luggage delivery management system 100 includes a communication interface 110, one or more processors 120 (hereinafter simply referred to as "processor 120"), and one or more storage devices 130 (hereinafter simply referred to as "storage device 130").

The communication interface 110 includes at least one of the communication interface 21 and the communication interface 31.

The processor 120 executes various information processes. For example, the processor 120 includes a central processing unit (CPU). Various types of information necessary for processes by the processor 120 are stored in the storage device 130. Examples of the storage device 130 include a volatile memory, a non-volatile memory, a hard disk drive (HDD), a solid state drive (SSD), and the like.

A luggage delivery management program 140 is a computer program executed by the processor 120. The functions of the luggage delivery management system 100 are realized through cooperation between the processor 120 executing the luggage delivery management program 140 and the storage device 130. The luggage delivery management program 140 is stored in the storage device 130. The luggage delivery management program 140 may be recorded on a computer-readable recording medium. The luggage delivery management program 140 may be provided via a network.

The processor 120 receives the request information REQ and the payment amount information PMT from the terminal 10 via the communication interface 110. The request information REQ and the payment amount information PMT are stored in the storage device 130. The processor 120 executes the luggage delivery management process based on the request information REQ and the payment amount information PMT.

4-2. Luggage Delivery Management Process

Figure 10:
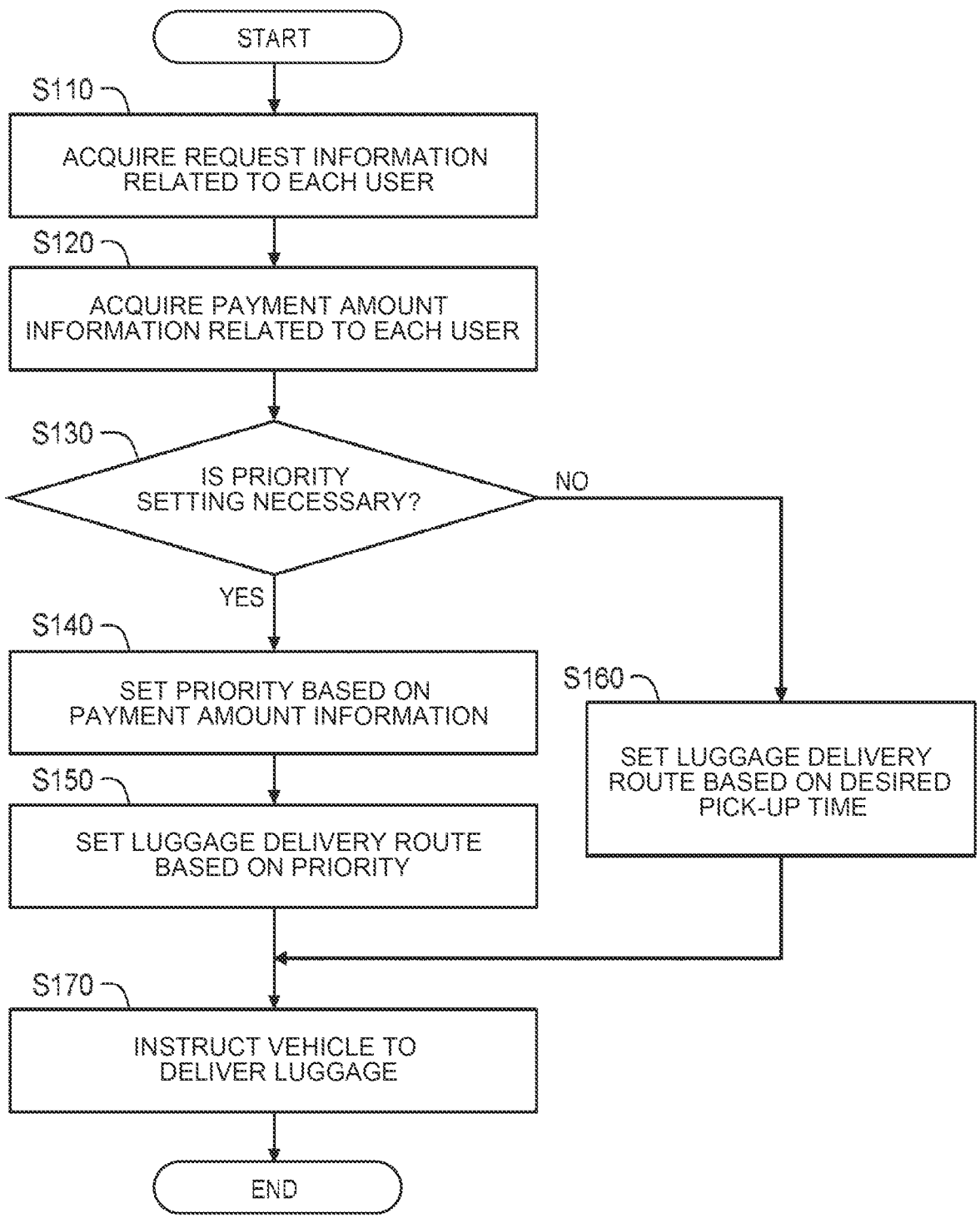
FIG. 10 is a flowchart showing a luggage delivery management process by the luggage delivery management system according to the embodiment.

FIG. 10 is a flowchart showing the luggage delivery management process by the processor 120 of the luggage delivery management system 100.

In step S110, the processor 120 acquires the request information REQ related to each user 1.

In step S120, the processor 120 acquires the payment amount information PMT related to each user 1.

In step S130, the processor 120 determines whether to set the priority of the multiple pieces of luggage 2 based on the request information REQ related to the users 1.

For example, when any user 1 does not specify the desired pick-up time in the request information REQ, the processor 120 determines that priority setting for the multiple pieces of luggage 2 is necessary (see FIG. 5).

As another example, when the request information REQ indicates the desired pick-up time specified by the user 1, the processor 120 determines whether to set the priority based on the desired pick-up time (see FIG. 6). Specifically, the processor 120 compares the comparison period related to each of the users 1. The comparison period is a predetermined period including the desired pick-up time. When there are two or more users 1 whose comparison periods at least partially overlap with each other, the processor 120 determines that it is necessary to set the priority of the luggage 2 of each of the two or more users 1.

For the multiple pieces of luggage 2 for which priority setting is determined to be necessary, the process proceeds to step S140. For other pieces of luggage 2, the process proceeds to step S160.

In step S140, the processor 120 sets the priority based on the payment amount information PMT related to the users 1. More specifically, the processor 120 sets a higher priority of the luggage 2 of the user 1 who pays more. After that, the process proceeds to step S150.

The processor 120 may notify the users 1 of the priority information PRI related to the set priority via the terminal 10 (see FIG. 7). The processor 120 may accept changes to payment amounts. In that case, the processor 120 acquires the changed payment amount information PMT and updates the payment amount information PMT. Then, the processor 120 resets the priority of the multiple pieces of luggage 2 based on the updated payment amount information PMT.

In step S150, the processor 120 sets the luggage delivery route of the vehicle 20 based on the set priority. Specifically, the processor 120 sets the luggage delivery route such that the multiple pieces of luggage 2 are delivered to the respective delivery destinations DST in accordance with the set priority. In other words, the processor 120 sets the luggage delivery route such that the luggage 2 with the highest priority is delivered first in descending order. The process then proceeds to step S170.

In step S160, the processor 120 sets the luggage delivery route of the vehicle 20 based on the desired pick-up time for each user 1. Specifically, the processor 120 sets the luggage delivery route such that the multiple pieces of luggage 2 are delivered to the respective delivery destinations DST in order of the desired pick-up times. In other words, the processor 120 sets the luggage delivery route such that the luggage 2 with the earliest desired pick-up time is delivered first in order. The process then proceeds to step S170.

In step S170, the processor 120 instructs the vehicle 20 to deliver the luggage by providing the vehicle 20 with the delivery management information DLV. Specifically, the processor 120 instructs the vehicle 20 to deliver the multiple pieces of luggage 2 to the respective delivery destinations DST in accordance with the set luggage delivery route. The vehicle 20 delivers the multiple pieces of luggage 2 to the respective delivery destinations DST in accordance with the instructed luggage delivery route.

What is claimed is:

1. A luggage delivery management system that manages a service of delivering multiple pieces of luggage deposited by a plurality of users and delivering the multiple pieces of luggage by one autonomous vehicle, each user of the plurality of users having a terminal that accepts user input of request information and user input of a desired pick-up time, the request information indicating a destination to deliver a luggage of the multiple pieces of luggage, the desired pick-up time indicating a time at which the user requests to pick-up the luggage of the user at the destination in the request information of the user, the terminal stores payment amount information indicating an amount equivalent to a payment amount paid by the user for the service, the luggage delivery management system comprising the autonomous vehicle, one or more processors, and a communication interface, wherein the one or more processors:

acquire the request information, the desired pick-up time and the payment amount information from the terminal of each of the plurality of users via the communication interface;

set, for each user of the plurality of users, a comparison period that is a predetermined period extending before and after the desired pick-up time of the user;

when the comparison periods of two or more of the users overlap with each other, determine that it is necessary to set a priority for the luggage of the two or more users, included in the multiple pieces of luggage, whose comparison periods overlap with each other;

for the luggage for which it has been determined that it is necessary to set the priority, set a higher priority of the luggage of the user that has higher payment amounts based on the payment amount information;

set a luggage delivery route of the one autonomous vehicle to deliver the multiple pieces of luggage to the destinations wherein the luggage having the highest priority is delivered before any of the luggage having a lower priority, with remaining luggage for which the priority has been set being delivered in descending order of priority; and instruct the one autonomous vehicle to deliver the multiple pieces of luggage to the destinations in accordance with the luggage delivery route, by sending an instruction via the communication interface to the one autonomous vehicle; and a vehicle control system of the one autonomous vehicle controls the one autonomous vehicle to deliver the multiple pieces of luggage to the destinations in accordance with the luggage delivery route according to the instruction sent via the communication interface.

2. The luggage delivery management system according to claim 1, wherein the one or more processors further notify the users of information related to the set priority.

3. The luggage delivery management system according to claim 2, wherein the one or more processors further accept a change to the payment amount from any of the users.

4. The luggage delivery management system according to claim 1, wherein the multiple pieces of luggage are carried by the respective users to one or more collection locations, and are loaded into the one autonomous vehicle at the one or more collection locations.

5. The luggage delivery management system according to claim 1, wherein after the multiple pieces of luggage are loaded into the one autonomous vehicle, the one or more processors instruct the one autonomous vehicle to deliver the multiple pieces of luggage to the destinations in accordance with the luggage delivery route.

6. The luggage delivery management system according to claim 1, wherein a luggage of a user whose comparison period overlaps with another user's comparison period is subjected to the priority setting, a luggage of a user whose comparison period does not overlap with another user's comparison period is excluded from the priority setting, and the one or more processors set the luggage delivery route so that the luggage of the user whose comparison period does not overlap with another user's comparison period is delivered in order of the desired pick-up time.

7. A luggage delivery management method that manages a service of delivering multiple pieces of luggage deposited by a plurality of users and delivering the multiple pieces of luggage by one autonomous vehicle, each user of the plurality of users having a terminal that accepts user input of request information and user input of a desired pick-up time, the request information indicating a destination to deliver a luggage of the multiple pieces of luggage, the desired pick-up time indicating a time at which the user requests to pick-up the luggage of the user at the destination in the request information of the user, the terminal stores payment amount information indicating an amount equivalent to a payment amount paid by the user for the service, the luggage delivery management being managed by a system including one or more processors and a communication interface, the luggage delivery management method comprising:

acquiring, by the one or more processors, the request information, the desired pick-up time and the payment amount information from the terminal of each of the plurality of users via the communication interface;

setting, by the one or more processors, for each user of the plurality of users, a comparison period that is a predetermined period extending before and after the desired pick-up time of the user;

when the comparison periods of two or more of the users overlap with each other, determining, by the one or more processors, that it is necessary to set a priority for the luggage of the two or more users, included in the multiple pieces of luggage, whose comparison periods overlap with each other;

for the luggage for which it has been determined that it is necessary to set the priority, setting, by the one or more processors, a higher priority of the luggage of the user that has higher payment amounts based on the payment amount information;

setting, by the one or more processors, a luggage delivery route of the one autonomous vehicle to deliver the multiple pieces of luggage to the destinations wherein the luggage having the highest priority is delivered before any of the luggage having a lower priority, with remaining luggage for which the priority has been set being delivered in descending order of priority;

instructing, by the one or more processors via the communication interface, the one autonomous vehicle to deliver the multiple pieces of luggage to the destinations in accordance with the luggage delivery route; and a control system of the one autonomous vehicle controlling the one autonomous vehicle, according to the instructing, to deliver the multiple pieces of luggage to the destinations in accordance with the luggage delivery route.

8. An autonomous vehicle to be used in a service of delivering multiple pieces of luggage deposited by a plurality of users, each user of the plurality of users having a terminal that accepts user input of request information and user input of a desired pick-up time, the request information indicating a destination to deliver a luggage of the multiple pieces of luggage, the desired pick-up time indicating a time at which the user requests to pick-up the luggage of the user at the destination in the request information of the user, the terminal stores payment amount information indicating an amount equivalent to a payment amount paid by the user for the service, the autonomous vehicle comprising one or more processors and a communication interface, wherein the one or more processors:

acquire the request information, the desired pick-up time and the payment amount information from the terminal of each of the plurality of users via the communication interface;

set, for each user of the plurality of users, a comparison period that is a predetermined period extending before and after the desired pick-up time of the user;

when the comparison periods of two or more of the users overlap with each other, determine that it is necessary to set a priority for the luggage of the two or more users, included in the multiple pieces of luggage, whose comparison periods overlap with each other for the luggage for which it has been determined that it is necessary to set the priority, set a higher priority of the luggage of the user that has higher payment amounts based on the payment amount information;

set a luggage delivery route of the autonomous vehicle to deliver the multiple pieces of luggage to the destinations wherein the luggage having the highest priority is delivered before any of the luggage having a lower priority, with remaining luggage for which the priority has been set being delivered in descending order of priority; and control the autonomous vehicle to deliver the multiple pieces of luggage to the destinations in accordance with the luggage delivery route.

\* \* \* \* \*